United States Patent
Kang et al.

(10) Patent No.: US 7,392,304 B2
(45) Date of Patent: Jun. 24, 2008

(54) APPARATUS FOR HOME NETWORK MIDDLEWARE INTEROPERABILITY SERVICE USING HOME GATEWAY AND OSGI PLATFORM AND METHOD THEREOF

(75) Inventors: Dong Oh Kang, Daejeon-Shi (KR); Kyu Chang Kang, Daejeon-Shi (KR); Jeun Woo Lee, Daejeon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 763 days.

(21) Appl. No.: 10/898,288

(22) Filed: Jul. 26, 2004

(65) Prior Publication Data

US 2005/0144262 A1    Jun. 30, 2005

(30) Foreign Application Priority Data

Dec. 26, 2003    (KR)    ...................... 10-2003-0097268

(51) Int. Cl.
 G06F 15/173    (2006.01)
(52) U.S. Cl. ........................ 709/223; 709/217; 709/218; 709/219; 709/224; 709/229
(58) Field of Classification Search ......... 709/217–219, 709/223, 224, 229
 See application file for complete search history.

(56) References Cited

U.S. PATENT DOCUMENTS 7,263,511 B2 *    8/2007    Bodin et al. ................... 706/48
2002/0083342 A1 *   6/2002    Webb et al. .................. 713/201
2005/0005002 A1 *   1/2005    Bodin et al. ................. 709/223
2005/0050184 A1 *   3/2005    Boden et al. ................. 709/223
2005/0114491 A1 *   5/2005    Bushmitch et al. .......... 709/223
2005/0278441 A1 *  12/2005    Bond et al. .................. 709/223

FOREIGN PATENT DOCUMENTS

| KR | 2003-04540 | 1/2003 |
|----|------------|--------|
| KR | 2003-73180 | 9/2003 |
| KR | 2003-73433 | 9/2003 |
| KR | 2003-75691 | 9/2003 |
| WO | WO 02/09350 | 1/2002 |

OTHER PUBLICATIONS

Park et al.; "Middleware for Digital Home Service and Application Service Technology thereof"; The Journal of Korean Institute of Communication Sciences; 2002; pp. 56-65.

* cited by examiner

*Primary Examiner*—Liangche A Wang
(74) *Attorney, Agent, or Firm*—Lowe Hauptman Ham & Berner LLP

(57) ABSTRACT

Provided is an apparatus for a home network middleware interoperability service using a home gateway and an OSGi platform and method thereof, the apparatus comprising: a plurality of home network devices in which various types of middlewares are mounted; a home gateway in which a plurality of middleware bundles for supporting the various types of middlewares and an OSGi platform are mounted, and with which information on the home network devices is transferred to an external network; and a service provider connected to the home gateway via an external network and receiving information on the home network devices and downloading to the home gateway the middleware bundles appropriate to the user's home network to provide the middleware interoperability service.

5 Claims, 7 Drawing Sheets

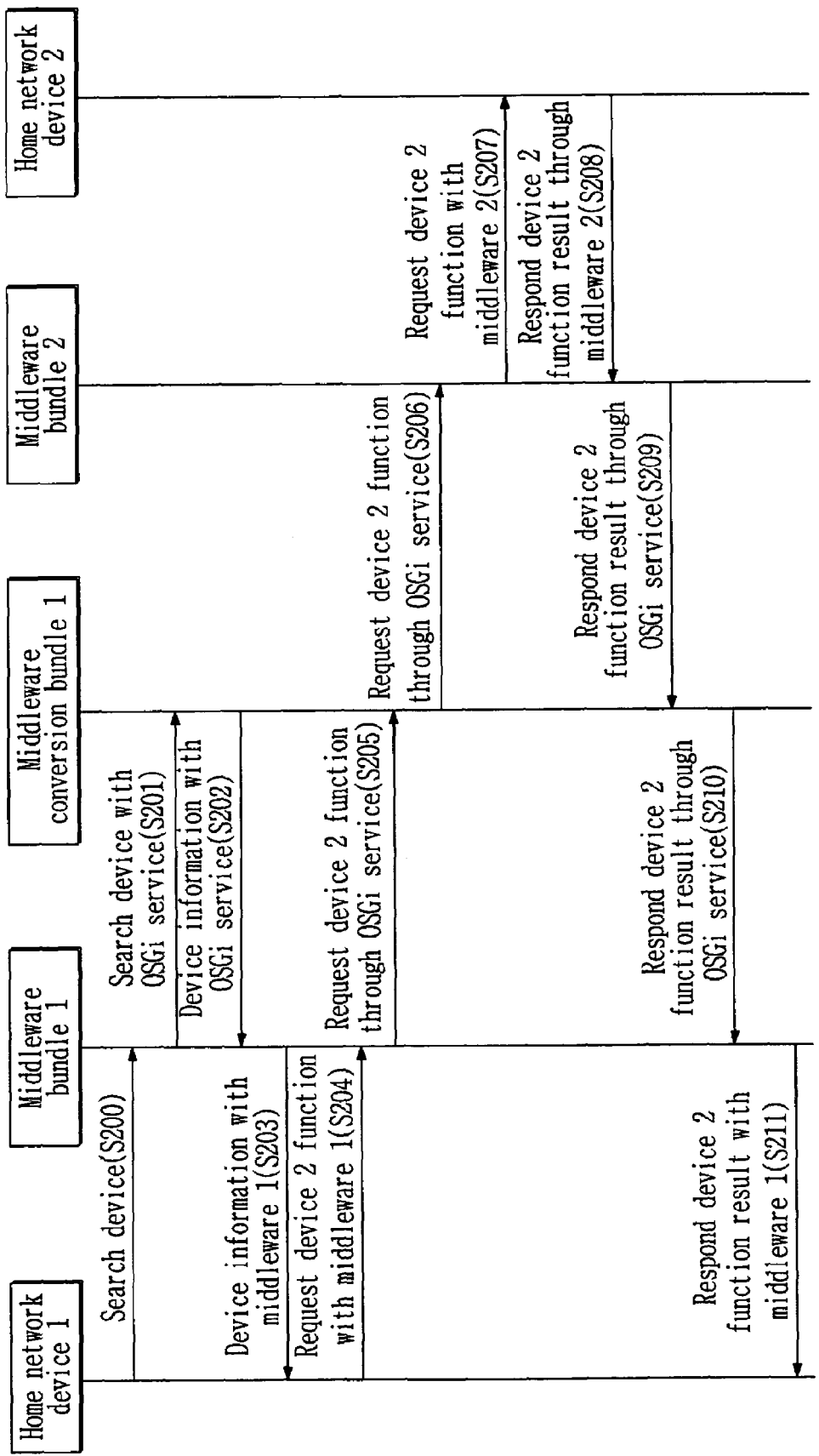

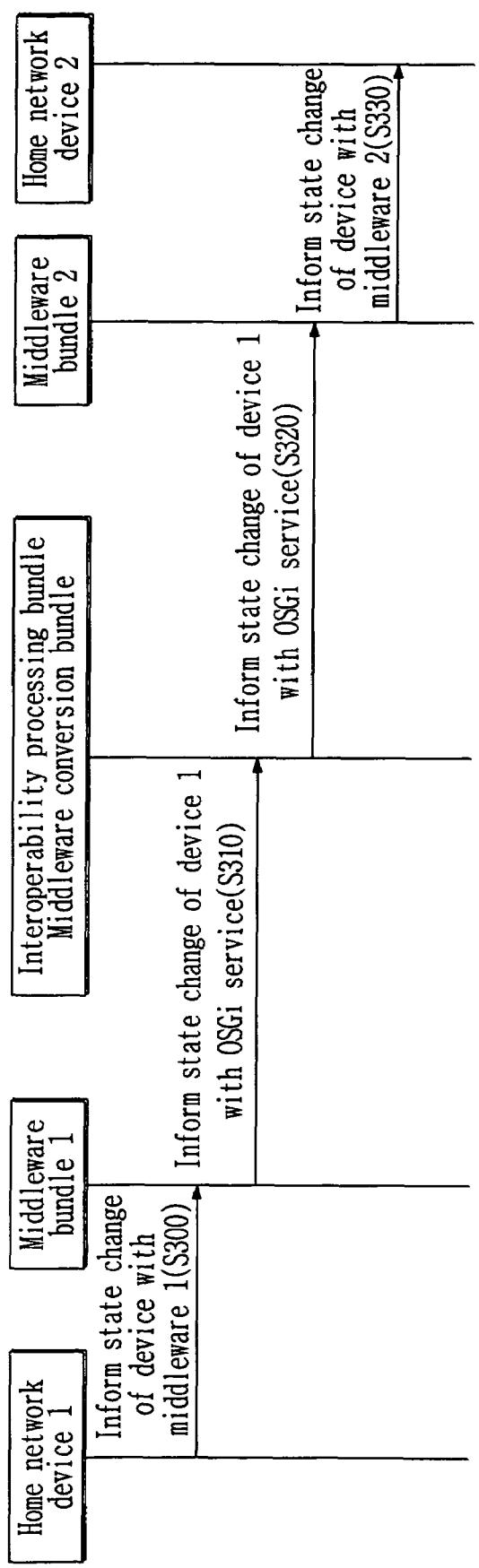

APPARATUS FOR HOME NETWORK MIDDLEWARE INTEROPERABILITY SERVICE USING HOME GATEWAY AND OSGI PLATFORM AND METHOD THEREOF

BACKGROUND

1. Field of the Invention

The present invention generally relates to an apparatus for a home network middleware interoperability service using a home gateway and an OSGi platform and method thereof and, more specifically, to an apparatus for a home network middleware interoperability service using a home gateway and an OSGi platform and method thereof, wherein an OSGi bundle that incorporates and converts different middleware functions on a home network of a user is downloaded on the home gateway to operate on the OSGi platform so that a service that matches individual characteristics of the service user can be provided and an added interoperability service can be rendered regarding the change of the home network environment such as adding a new middleware and a device.

2. Discussion of Related Art

In general, in the conventional method of providing interoperability among different types of middlewares, every apparatus should be equipped with a conversion module that can converts the different types of middleware, resulting in a heavy weight.

That is, each apparatus should have the conversion module for all middlewares intended to convert. Further, when a new middleware is introduced, the conversion module for this should be newly reconfigured and mounted in each apparatus, thus incurring cost and time issues.

Further, when a new device is introduced to the market, each middleware association should newly redefine the apparatus model to add this to the middleware, in which the conversion of the device level should be newly applied to the new conversion model, so that a problem exists that such an interoperability method provides only restrictive performance.

SUMMARY OF THE INVENTION

The present invention is directed to an apparatus for a home network middleware interoperability service using a home gateway and an OSGi platform and method thereof wherein, by using a home gateway that is connected to each apparatus through the user's home network and is connected to a service provider through the external network, and by using an OSGi platform that can dynamically download and manage a bundle, a change of the home network environment such as new middleware appearance, middleware version change, new apparatus definition in each middleware, and new apparatus mounted onto the network can be rapidly coped with, and a continuous interoperability service can be efficiently provided at low cost.

One aspect of the present invention is to provide an apparatus for a home network middleware interoperability service using a home gateway and an OSGi platform comprising: a plurality of home network devices in which various types of middlewares are mounted; a home gateway in which a plurality of middleware bundles for supporting the various types of middlewares and an OSGi platform are mounted, and with which information on the home network devices is transferred to an external network; and a service provider connected to the home gateway via the external network and receiving information on the home network devices and downloading to the home gateway the middleware bundles appropriate to the user's home network to provide the middleware interoperability service.

In the above configuration, preferably, the home gateway includes: a middleware bundle module having a plurality of middleware bundles to collect information on devices that support the home network middleware and to provide the collected information through OSGi service; an interoperability processing bundle for collecting the information exported from each middleware bundle to provide to the service provider; a middleware conversion bundle for interacting with each middleware bundle using the OSGi service to perform a device level conversion among different middlewares as well as to export a message of each middleware device to different middleware devices; and an OSGi framework for managing and operating various types of OSGi bundles to enable OSGi service registration and utilization among the OSGi bundles.

Preferably, each middleware bundle, the interoperability-processing bundle and the middleware conversion bundle are downloaded from the service provider.

Another aspect of the present invention is to provide a service method of operating an apparatus configured to interoperate among devices mounting various types of middlewares connected to a home network, using a home gateway connected to each device via the home network and connected to a service provider via an external network and an OSGi platform capable of actively downloading and managing the bundle, the method comprising the steps of: (a) downloading an interoperability-processing bundle from the service provider and requesting information on the device that supports each middleware; (b) searching the requested information on the device that supports each middleware, and using the OSGi service to provide the result to the service provider; (c) making a middleware conversion bundle appropriate to the user's home network for the middleware interoperability service based on the information on the device received from the service provider to download to the home gateway; and (d) providing an interoperability service among different middlewares operated in the home gateway through the middleware conversion bundle downloaded from the service provider.

BRIEF DESCRIPTION OF THE DRAWINGS

The above and other features of the present invention will be described in reference to certain exemplary embodiments thereof with reference to the attached drawings in which:

FIG. 6 is a flow chart for illustrating interoperability between different middleware devices through the middleware conversion bundle to which an exemplary embodiment of the present invention is applied; and FIG. 7 is a flow chart for illustrating a function of informing an apparatus state change of the home network to which an exemplary embodiment of the present invention is applied.

DETAILED DESCRIPTION OF PREFERRED EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein.

Figure 1:
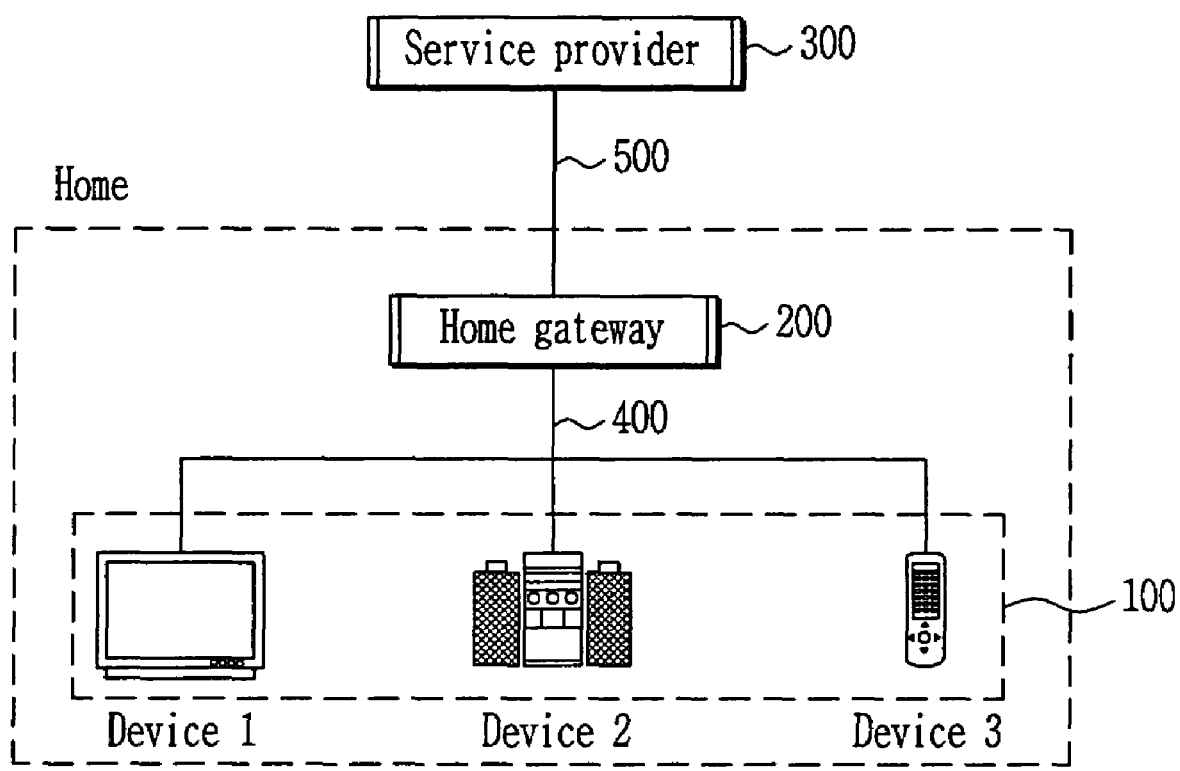
FIG. 1 is a general block diagram illustrating an apparatus for a home network middleware interoperability service using a home gateway and an OSGi platform according to an exemplary embodiment of the present invention.
Figure 2:
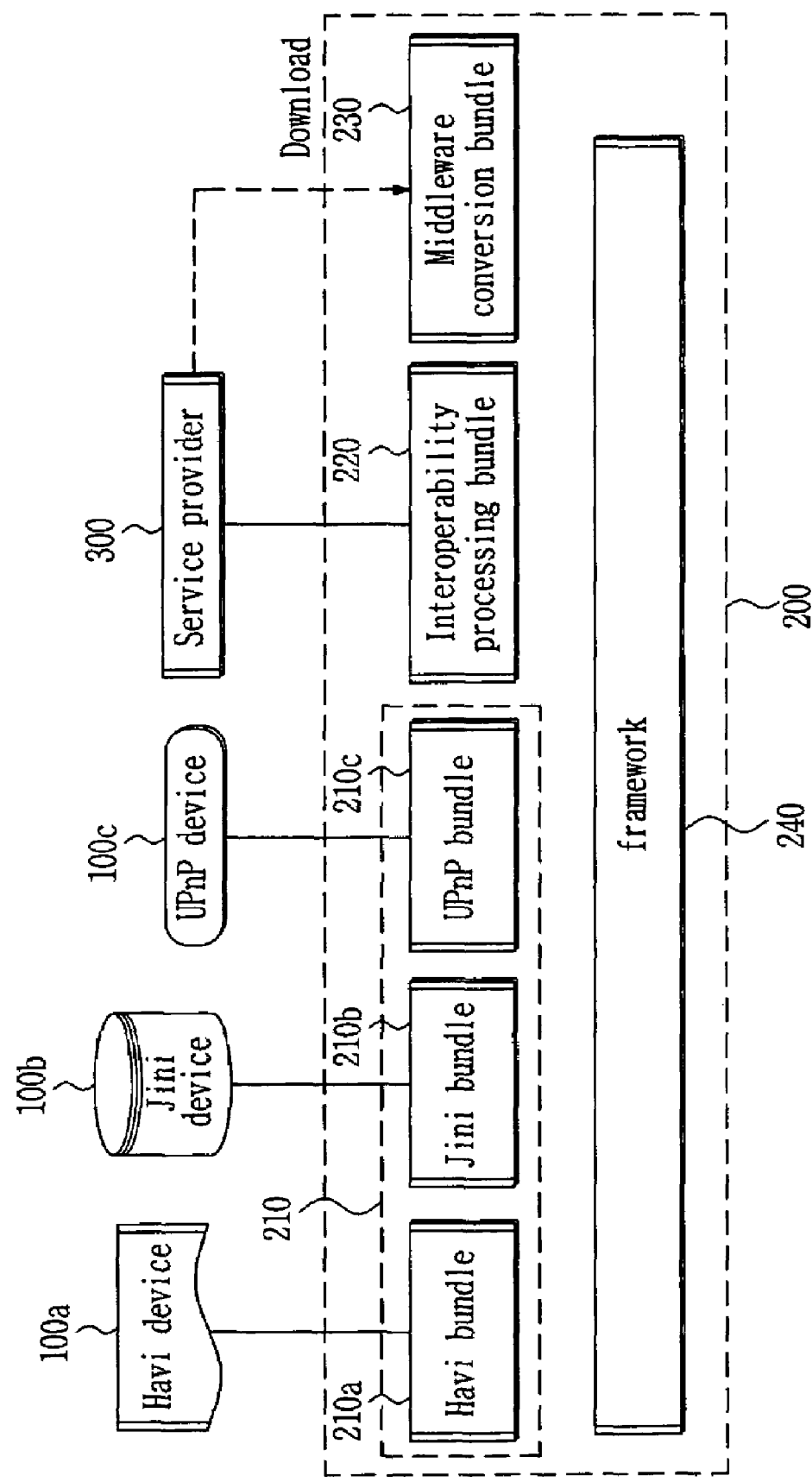
FIG. 2 is a block diagram specifically illustrating OSGi bundles operated in the home gateway of FIG. 1.

FIG. 1 is a general block diagram illustrating an apparatus for a home network middleware interoperability service using a home gateway and an OSGi platform according to an exemplary embodiment of the present invention, and FIG. 2 is a block diagram specifically illustrating OSGi bundles operated in the home gateway of FIG. 1.

As shown in FIGS. 1 and 2, an apparatus for a home network middleware interoperability service using a home gateway and an OSGi platform according to an exemplary embodiment of the present invention is mainly composed of home network devices 100, a home gateway 200 and a service provider 300.

In the foregoing configuration, the home network devices 100 includes a home network middleware such as Havi, Jini, and UPnP, or downloads this from the external service provider 300 to interoperate with the home network device having the same middleware.

The home gateway 200 is interconnected with the home network devices 100 through the home network 400, as well as with the service provider 300 through the external network 500, to download an open service gateway initiative (OSGi) bundle (e.g., interoperability processing bundle, middleware conversion bundle) for middleware interoperability service, and to provide information on the home network devices 100 to the service provider 300, so that a middleware conversion bundle 230 appropriate to the user is downloaded to perform a role of providing a middleware interoperability service to the user.

Here, the home network 400 can be implemented with various types of wired/wireless networks such as Ethernet, PLC, IEEE1394 and WLAN.

This home gateway 200 is composed of a middleware bundle module 210 having a plurality of middleware bundles 210a~210c to collect information on devices 100a~100c that support the home network middleware, and to provide the collected information to an interoperability processing bundle 220 described later through OSGi service 210a'~210c'; an interoperability processing bundle 220 for collecting the information exported from each middleware bundle 210a~210c to provide to the service provider 300; a middleware conversion bundle 230 for interacting with each middleware bundle 210a~210c using the OSGi service 230a to perform device level conversion among different middlewares as well as to export a message of each middleware device 100a~100c to other middleware devices; and an OSGi framework 240 for managing and operating various types of OSGi bundles 210~230 to enable OSGi service registration and utilization among the OSGi bundles 210~230.

Here, the service provider 300 can also download the middleware bundle module 210 as an OSGi bundle that supports one middleware. Further, it exports the OSGi service 230a corresponding to this middleware in the middleware conversion bundle 230 to communicate with the home network devices 100.

That is, each middleware bundle 210a~210c at the OSGi platform of the home gateway 200 communicates with the home network devices 100 connected with the home gateway 200, and provides information on the home network devices 100 to the interoperability processing bundle 220 as an OSGi service 210a'~210c'. Further, each middleware bundle 210a~210c has a function of exporting the OSGi service provided from other OSGi bundles (for example, interoperability processing bundle and middleware conversion bundle) to the home network 400. Later, this function exports the OSGi service 230a, provided from the middleware conversion bundle 230 that is downloaded from the service provider 300, to the other device on the home network 400.

The interoperability processing bundle 220 collects information on the devices 100a~100c that support each middleware from each middleware bundle 210a~210c on the home gateway 200 to export the collected information to the service provider 300. Here, the OSGi service 210a'~210c' for each middleware bundle 210a~210c is used.

That is, the interoperability processing bundle 220 provides the information provided from each middleware bundle 210a~210c to the service provider 300 and allows the service provider 300 to download the most appropriate middleware conversion bundle 230 to the devices 100 connected to the home gateway 200. As such, in addition to the conversion of the lower portion of the middleware, the conversion of the upper portion is also possible, and the middleware conversion bundle the most appropriate to the current home network is equipped.

The middleware conversion bundle 230 is downloaded to the home gateway 200 by the service provider 300, and interacts with the middleware bundles 210a~210c and the OSGi service 230a to perform a change of device level among different middlewares, and to perform a role of exporting each middleware device message to the different middleware devices.

The OSGi framework 240 capable of managing and operating the OSGi bundles 210~230 (e.g., middleware bundle module, interoperability processing bundle and middleware conversion bundle) allows registration and utilization of the OSGi service among the OSGi bundles 210~230.

Meanwhile, the home gateway 200 with the foregoing configuration should have an environment in which the OSGi platform can be operated, and preferably, includes an interface unit that can be connected to each home network device 100.

The service provider 300 is connected to the home gateway 200 via an external network 600, receives the information on the home network devices 100 and downloads the middleware conversion bundle 230 appropriate to the user's home network to act as a middleware interoperability service provider.

Further, when the home network environment is changed, this service provider 300 can download a new middleware conversion bundle.

A method for a home network middleware interoperability service using a home gateway and an OSGi platform of the present invention having the foregoing configuration will now be described in detail.

Figure 3:
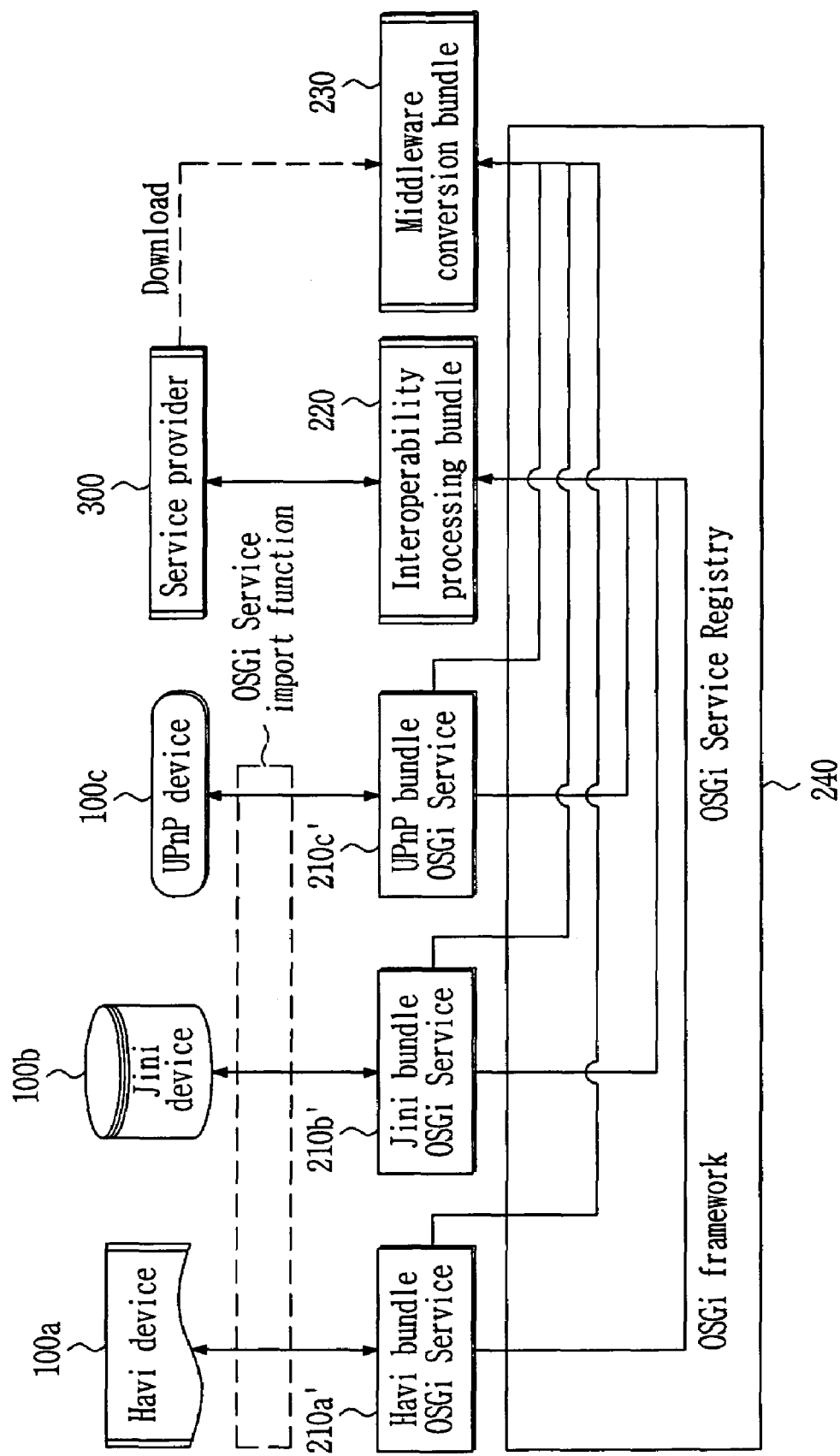
FIG. 3 is a diagram for illustrating a function of collecting information on the home network device to which an exemplary embodiment of the present invention is applied.

FIG. 3 is a diagram for illustrating a function of collecting information on the home network device to which an exemplary embodiment of the present invention is applied, showing a function in terms of a method of collecting the information on the devices 100 of the home network 400 and exporting the collected information to the service provider 300.

As shown in FIG. 3, each middleware bundle 210a~210c uses a respective middleware to search the devices 100a~100c that support the middleware on the home network 400, and generates the OSGi service 210a'~210c' based on the information of the device to register this at an OSGi framework 240 (OSGi Service Registry). This is used by the interoperability processing bundle 220 and the middleware conversion bundle 230.

Figure 4:
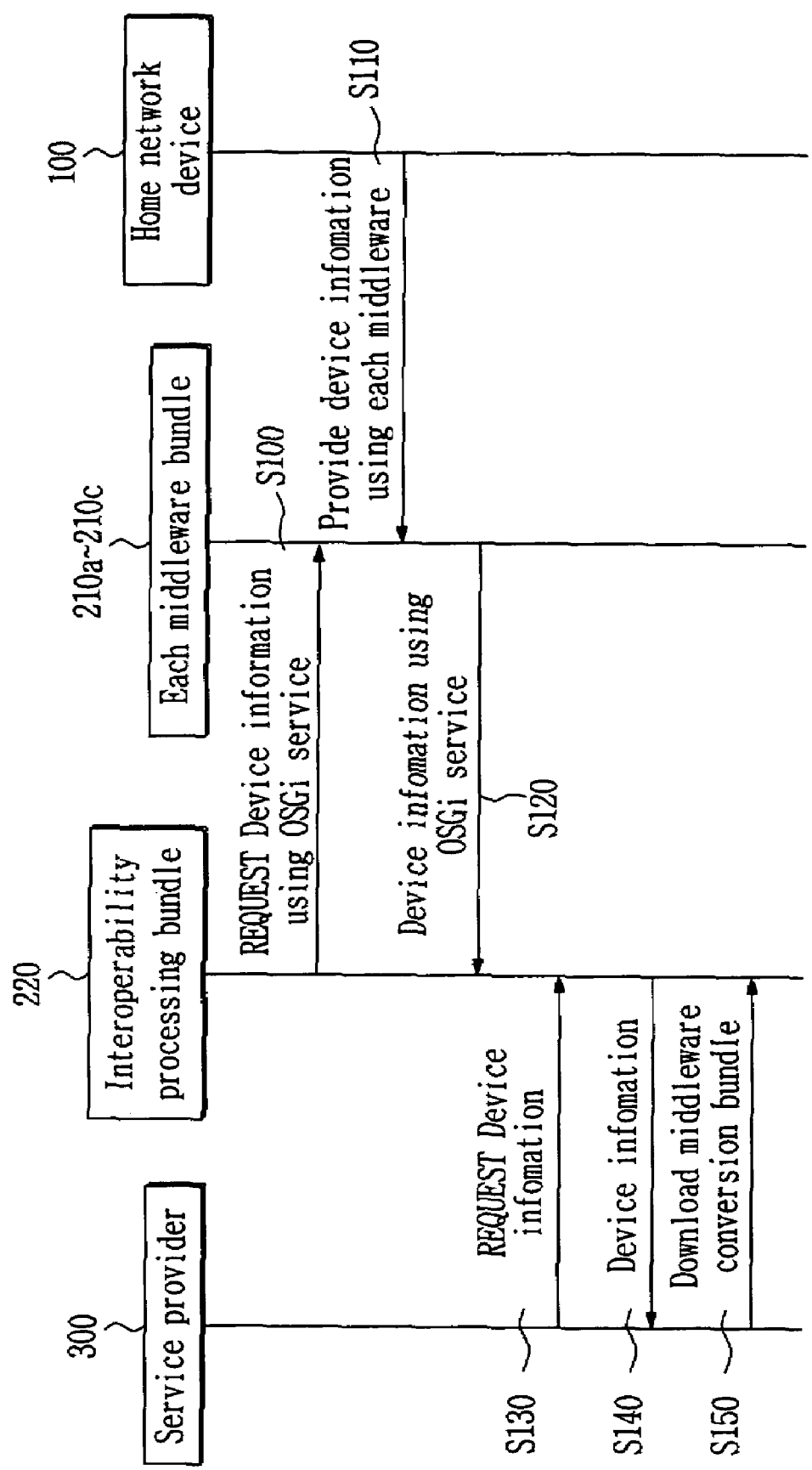
FIG. 4 is a flow chart for illustrating a process of downloading a middleware conversion bundle through communication with a service provider to which an exemplary embodiment of the present invention is applied.

FIG. 4 is a flow chart for illustrating a process of downloading a middleware conversion bundle through communication with a service provider to which an exemplary embodiment of the present invention is applied, showing an operational principle when the service provider 300 and the interoperability processing bundle 220 exchange the information to download the appropriate middleware conversion bundle 230.

As shown in FIG. 4, first, the interoperability processing bundle 220 requests the information on the devices 100a~100c that support each middleware from each middleware bundle 210a~210c, when downloaded to the home gateway 200 through the service provider 300 (S100). Here, the information on the imported device is provided to the above OSGi service 210a'~210c' (S110, S120). Next, when the service provider 300 requests the information on the home network device 100 to the interoperability processing bundle 220 (S130), the information for this is provided to the service provider 300 (S140). When the service provider 300 makes the middleware conversion bundle 230 and downloads this to the home gateway 200 (S150), the information herein is used for fabricating the middleware conversion bundle 230.

Figure 5:
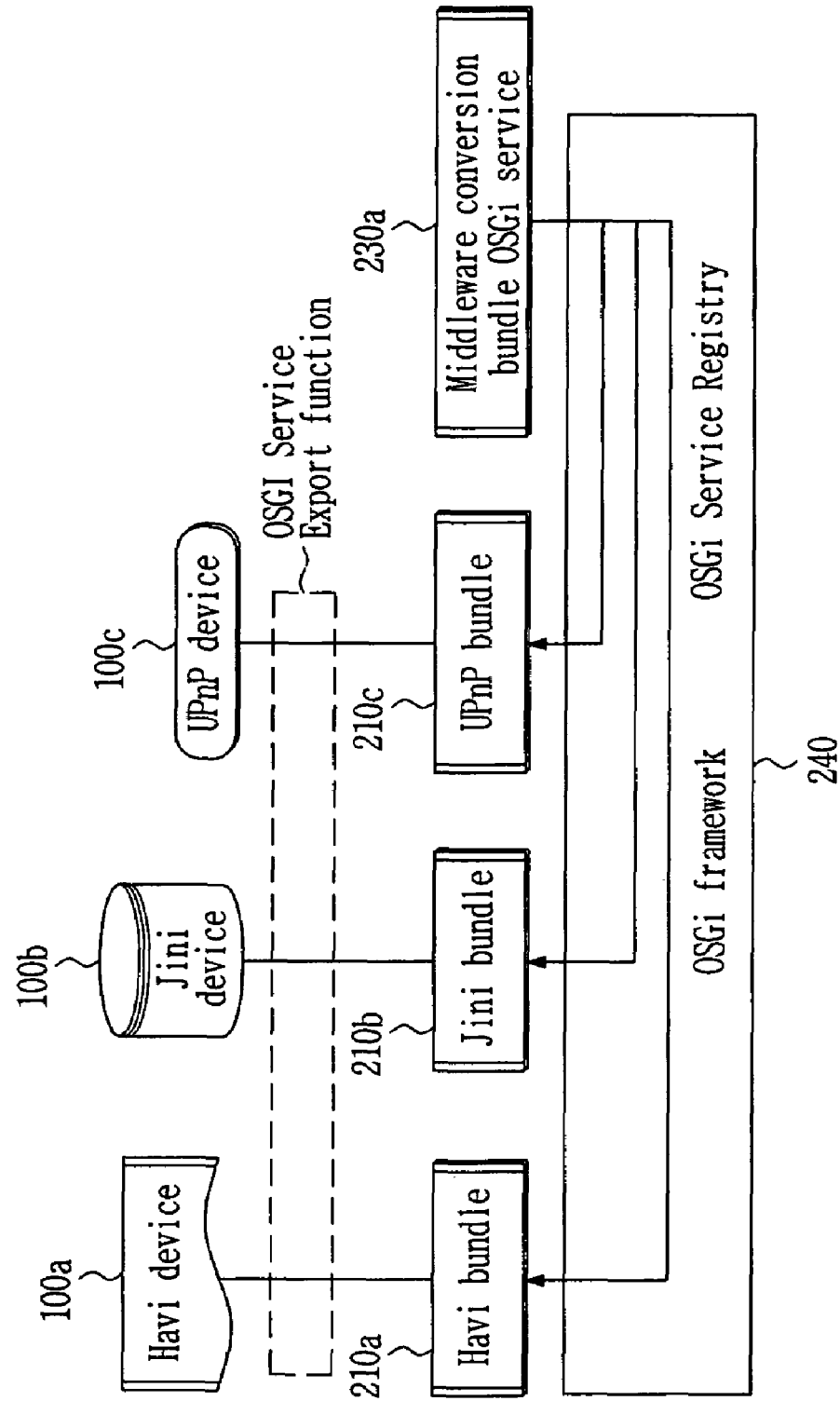
FIG. 5 is a diagram for illustrating a method of using a function of middleware devices through an individual middleware bundle using an OSGi platform in the middleware conversion bundle to which an exemplary embodiment of the present invention is applied.

FIG. 5 is a diagram for illustrating a method of using a function of middleware devices through an individual middleware bundle using an OSGi platform in the middleware conversion bundle to which an exemplary embodiment of the present invention is applied, showing an operational principle that the middleware conversion bundle 230 and each middleware bundle 210a~210c downloaded from the service provider 300 provide the OSGi service 230a via the OSGi framework 240 to provide the middleware interoperability service.

As shown in FIG. 5, first, the middleware conversion bundle 230 downloaded from the service provider 300 converts a function of each middleware device into a function of device corresponding to other middlewares, and registers this to the OSGi service 230a of other middleware bundles (OSGi Service Registry). When a new OSGi service 230a is registered, each middleware bundle informs this to the home network devices 100a~100c through OSGi service export function. The device using the same middleware as this middleware bundle recognizes the home gateway 200 as a new middleware device, and makes a necessary operation with the home gateway 200 to re-export to other devices through other middleware bundles. Therefore, the home gateway 200 can be configured with two different middleware devices by means of the middleware conversion bundle 230.

FIG. 6 is a flow chart for illustrating interoperability among different middleware devices through the middleware conversion bundle to which an exemplary embodiment of the present invention is applied, showing an operation for searching a home network device 2 that uses a middleware different from that of a home network device 1 to use this function.

As shown in FIG. 6, first, the home network device 1 requests searching a device to the middleware bundle 1 (S200), and the device is searched using the OSGi service of the middleware bundle 1 (S201) to the middleware conversion bundle 230, and the information on the device using the OSGi service of the middleware conversion bundle 230 is exported (S202), and the information on the device that uses the middleware 1 is exported to the home network device 1 (S203).

Next, the home network device 1 requests a function of the home network device 2 to the middleware bundle 1 by using the middleware 1 (S204), and the function of the home network device 2 through the OSGi service of the middleware bundle 1 is requested to the middleware conversion bundle 230 (S205), and the function of the home network device 2 through the OSGi service of the middleware conversion bundle 230 is requested to the middleware bundle 2 (S206).

Next, the middleware bundle 2 requests a function of the home network device 2 through the middleware 2 to the home network device 2 (S207), and the functional result of the home network device 2 through the middleware 2 is responded to the middleware bundle 2 (S208), and then, the functional result of the home network device 2 through the OSGi service of the middleware bundle 2 is responded to the middleware conversion bundle 230 (S209).

Next, the functional result of the home network device 2 through the OSGi service of the middleware conversion bundle 230 is responded to the middleware bundle 1 (S210), and the middleware bundle 1 responds the functional result of the home network device 2 to the home network device 1 by using the middleware 1 (S211).

That is, an interoperability operation is performed using the OSGi service of the middleware bundle 1 that supports the middleware of the home network device 1, the middleware conversion bundle 230 and the middleware bundle 2 that supports the middleware of the home network device 2.

FIG. 7 is a flow chart for illustrating a function of informing an apparatus state change of the home network to which an exemplary embodiment of the present invention is applied, showing a function in terms of a method of informing the state change that occurs in the home network device 1 to the home network device 2 and the service provider 300.

As shown in FIG. 7, first, the middleware bundle 1 that supports the middleware of the home network device 1 informs the state change of the home network device 1 to the interoperability processing bundle 220 with the OSGi service 210a'~210c' and notifies this to the service provider 300 (S300, S310). Further, this can also be informed to the home network device 2, using the middleware conversion bundle 230 and the middleware bundle 2 that supports the middleware of the home network device 2 (S320, S330).

That is, when a state change such as turning on or off is made to each middleware device 100a~100c, each middleware bundle 210a~210c informs this to the middleware conversion bundle 230 to make other middleware devices informed of this. At the moment each middleware bundle 210~210c uses the OSGi service 230a of the middleware conversion bundle 230 to make an event, the middleware conversion bundle 230 is informed of this. Further, the change is also informed to the service provider 300 through the interoperability processing bundle 220 to cope with the change of the home network environment.

Therefore, an apparatus for a home network middleware interoperability service using a home gateway and an OSGi platform and method thereof described above download to the home gateway 200 an OSGi bundle, e.g., middleware conversion bundle 230 capable of incorporating and converting different middleware functions, and are operated on the OSGi platform, so that the device using each middleware regards a device using other middlewares as one using its own middleware rather than one using other middlewares.

Further, according to the present invention, functional interoperability for each middleware rather than a bridge on the existing physical layer and linker layer is provided, and also, the service provider uses the OSGi bundle to download through the external network 500, thus enabling easy conversion even to the new middleware.

That is, according to the present invention, in order to make an interoperation between different middlewares, the middleware conversion module is not established for each device, but only the home gateway 200 is managed by the service provider 300 with the OSGi platform, thus advantageously, a change of the home network environment such as new middleware appearance, middleware version change, new apparatus definition in each middleware, and new apparatus equipment on the network can be managed and flexibly dealt with a bundle.

According to the present invention, the home gateway 200 performs a function such as a bridge or a proxy in the middleware level, so that it appears to be a middleware-mounted in the single middleware and the communication with other middleware devices is processed through the home gateway 200.

Although the present invention has been described with reference to the exemplary embodiment of an apparatus for a home network middleware interoperability service using a home gateway and an OSGi platform and method thereof, it is not limited hereto, but rather, a variety of modifications can be made within claims and the detailed description of the present invention and the accompanying drawings, which is also in the scope of the present invention.

As described above, according to an apparatus for a home network middleware interoperability service using a home gateway and an OSGi platform and method thereof in the present invention, in order to make interoperation between different middlewares, the middleware conversion module is not established for each device, but only the home gateway 200 is managed by the service provider 300 with the OSGi platform, thus having a merit that interoperability among devices that use a variety of middlewares on the home network is provided for the device using different middleware to act as the device using the same middleware.

Further, by implementing a home gateway connected to each device through the user's home network and connected to the service provider through the external network and an OSGi platform that can dynamically download and manage a bundle, advantageously, the service provider can download and manage the OSGi bundle through the external network to support various middleware devices, and the service can be provided to match individual characteristics of the service user, and a change of the home network environment such as new middleware appearance, middleware version change, new apparatus definition in each middleware, and new apparatus equipment on the network can be rapidly coped with, and a continuous interoperability service can be efficiently provided at low cost.

What is claimed is:

1. An apparatus for a home network middleware interoperability service, comprising:
   a home network that includes:
      a plurality of home network devices that include different types of middleware; and
      a home gateway comprising:
         a plurality of middleware bundles that support the different types of middleware; and
         an OSGi (Open Standards Gateway Initiative) platform configured to transfer information on the home network devices to an external network external to the home network; and
   a service provider connected to the home gateway via the external network, the service provider configured to receive the information on the home network devices and download middleware conversion bundles based on the received information to the home gateway to provide the middleware interoperability service;
   wherein the OSGi platform includes:
   a middleware bundle module having a plurality of middleware bundles configured to collect information on the home network devices and export the collected information through a OSGi service;
   an interoperability processing bundle configured to collect the information exported from each middleware bundle and send the information to the service provider;
   a middleware conversion bundle configured to interact with each middleware bundle using the OSGi service to perform device level conversion among the different types of middleware, and export middleware device messages to the different middleware devices; and
   an OSGi framework configured to control the plurality of middleware tare bundles and enable OSGi service registration and in middleware bundles utilization.

2. The apparatus according to claim 1, wherein each middleware bundle, the interoperability-processing bundle and the middleware conversion bundle is downloaded from the service provider.

3. The apparatus according to claim 1, wherein the service provider is configured to download a new middle conversion bundle to the home gateway whenever the home network environment is changed.

4. A method for servicing middleware devices in a home network comprising an OSGi (Open Standards Gateway Initiative) framework, the OSGi framework comprising: plurality of middle ware bundles supporting different types of middleware, the plurality of middleware bundles including a interoperability -processing bundle and a middleware conversion bundle; an OSGi platform configured to transfer information on the home network devices to a network external to the home network via a home gateway; and a service provider connected to the home gateway via the external network; the method comprising the steps of:
   (a) receiving on the home network an interoperability processing bundle downloaded from a service;
   (b) the interoperability-processing bundle requesting, via OSGi service, device information from each middleware bundle;
   (c) the interoperability-processing bundle collecting the device information exported from each middleware bundle;
   (d) the interoperability-processing bundle forwarding the device information to the service provider;
   (e) the service provider generating a home network specific middleware conversion bundle for middleware interoperability servicing based on the device information received from the home gateway;
   (f) downloading the generated home network specific middleware conversion bundle to the home gateway; and
   (g) the middleware conversion bundle interacting with each middleware bundle using the OSGi service to perform device level conversion among the different types of middleware, and export middleware device messages to different middleware devices;

whereby the OSGi framework controls the plurality of middleware bundles and enable OSQi service registration and middleware bundle utilization.

5. The service method according to claim 4, wherein the step (f) further comprises a step of downloading a new middleware conversion bundle by the service provider to the home gateway automatically, whenever the home network is changed.

* * * * *